(12) United States Patent
Brabson

(10) Patent No.: US 8,086,846 B2
(45) Date of Patent: Dec. 27, 2011

(54) PROVIDING NON-PROXY TLS/SSL SUPPORT IN A CONTENT-BASED LOAD BALANCER

(75) Inventor: Roy F. Brabson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/108,779

(22) Filed: Apr. 24, 2008

(65) Prior Publication Data

US 2009/0271613 A1 Oct. 29, 2009

(51) Int. Cl.
G06F 15/16 (2006.01)
(52) U.S. Cl. .......................................................... 713/151
(58) Field of Classification Search .................. 713/151, 713/152, 153, 161
See application file for complete search history.

(56) References Cited

U.S. PATENT DOCUMENTS

| | | | | |
|---|---|---|---|---|
| 7,111,162 | B1 * | 9/2006 | Bagepalli et al. | 713/151 |
| 2001/0034792 | A1 * | 10/2001 | Swildens | 709/238 |
| 2008/0209028 | A1 * | 8/2008 | Kurup et al. | 709/224 |

* cited by examiner

*Primary Examiner* — Ellen Tran
(74) *Attorney, Agent, or Firm* — DeLizio Gilliam, PLLC

(57) ABSTRACT

Methods and systems for providing non-proxy Secure Sockets Layer and Transport Layer Security (SSL/TLS) support in a content-based load balancer are described. A Transmission Control Protocol (TCP) connection is accepted from a client, and an SSL/TLS connection is established with the client such that random data used in key generation is created. A request is received from the client, and the request is decrypted. The request is processed, a target stack is selected, and the TCP connection, the SSL/TLS connection, and the random data are transferred to the selected target stack such that the client and selected target stack maintain an end-to-end TCP connection with a non-proxy SSL/TLS connection.

24 Claims, 3 Drawing Sheets

US 8,086,846 B2

PROVIDING NON-PROXY TLS/SSL SUPPORT IN A CONTENT-BASED LOAD BALANCER

BACKGROUND OF THE INVENTION

A load balancer is a server that manages an internet protocol ("IP") address and port. The load balancer manages a number of servers, referred to as "target stacks." When the load balancer receives a request for an IP address and/or port on a target stack that it is managing, the load balancer makes a selection from the target stacks capable of processing the request and forwards the request to the selected target stack. The metrics that a load balancer uses to select a target stack varies among implementations. Some load balancers use a simple round-robin metric, providing an even distribution of new requests among all target stacks. Other load balancers may factor the capacity and health of the target stacks into the selection process.

As long as the target stacks are all capable of handling the same requests received by the load balancer, conventional load balancing algorithms can be used. However, this is not always the case. In large server farms, it is sometimes necessary to partition the applications and data used to generate responses to queries among multiple servers. As such, a given target stack may only be able to process a subset of the overall requests received from a client.

A "content-based" load balancer is designed to handle these and other types of configurations. When a content-based load balancer receives a new connection from a client, it accepts the connection and, for Transmission Control Protocol (TCP), completes a 3-way handshake. The client then sends the initial query, which is examined by the load balancer. The load balancer then selects a target stack capable of handling the specific request from the set of available targets. Since the load balancer has terminated the connection with the client, it uses a separate connection to the target stack (either a long-running connection or a new connection) to relay the client's request.

There can be disadvantages to conventional content-based load balancers. First, for each client connection, the load balancer may terminate the TCP connection. This means the load balancer may be required to perform all TCP processing (e.g., the 3-way handshake) whenever it communicates with the client (e.g., manage windows, segmentation/reassembly, and so on). Additionally, the load balancer may be required to maintain one or more TCP connections to each target server, which can entail additional TCP processing overhead. Termination and creation of these TCP connections can adversely affect load balancer performance when traffic is great.

Another potential disadvantage of conventional content-based load balancers is that the load balancer may be required to process all inbound and outbound traffic between the client and the target stack. For example, when the request is received from the client, the load balancer can be required to receive the client request and forward it to the target stack. Likewise, the load balancer can be required to receive responses from the target server and forward the responses over the TCP connection to the client. This intermediate processing may not only reduce the capacity of the load balancer, but also increase latency between the client and the target stack.

Secure Sockets Layer ("SSL") and Transport Layer Security ("TLS") are encryption protocols that can be used to provide secure communications over the internet. SSL/TLS can be used to provide security for many applications, including web browsing, e-mail, instant messaging, and data transfers, for example. When using SSL/TLS to protect data sent to a conventional load balancer, the load balancer must terminate the SSL/TLS connection with the client, and maintain a separate SSL/TLS connection to an application running on the target stack. For data sent from the client to the target stack, the load balancer is usually required to decrypt the data received on the TCP connection with the client. After selecting a target stack, the load balancer generally re-encrypts the data before transferring the data to the application on the target server. Likewise, when the target stack sends data to the client, the load balancer is usually required to decrypt the data received from the target stack and re-encrypt the data before sending to the client. The decryption and re-encryption of data can be resource intensive for the load balancer, and can reduce the number of clients the load balancer can serve at any given time and/or lead to increased latency.

Also, some applications require that the client's SSL/TLS certificate be sent to the target stack before the target stack returns the requested data. In order to make the client's SSL/TLS certificate available on the target stack, conventional load balancers usually are required to use a protocol-specific (and often times proprietary) mechanism to pass the certificate.

BRIEF SUMMARY OF THE INVENTION

Methods and systems for providing non-proxy Secure Sockets Layer and Transport Layer Security (SSL/TLS) support in a content-based load balancer end-to-end content-based load balancing are described. A TCP connection is accepted from a client, and an SSL/TLS connection is established with the client such that random data used in key generation is created. A request is received from the client, and the request is decrypted. The request is processed, a target stack is selected, and the TCP connection, the SSL/TLS connection, and the random data is are transferred to the selected target stack such that the client and selected target stack maintain an end-to-end TCP connection with a non-proxy SSL/TLS connection.

In an exemplary embodiment, the request can be processed in a TCP kernel. In another preferred embodiment, the TCP connection can include TCP data packets, the SSL/TLS connection can include SSL/TLS data packets, and the request can include request data packets. The TCP connection transfer can be performed by replaying the TCP data packets, the random data, the SSL/TLS data packets and the request data packets to the selected target stack.

DETAILED DESCRIPTION OF THE INVENTION

Processes and systems for providing non-proxy Secure Sockets Layer and Transport Layer Security (SSL/TLS) support in a content-based load balancer are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
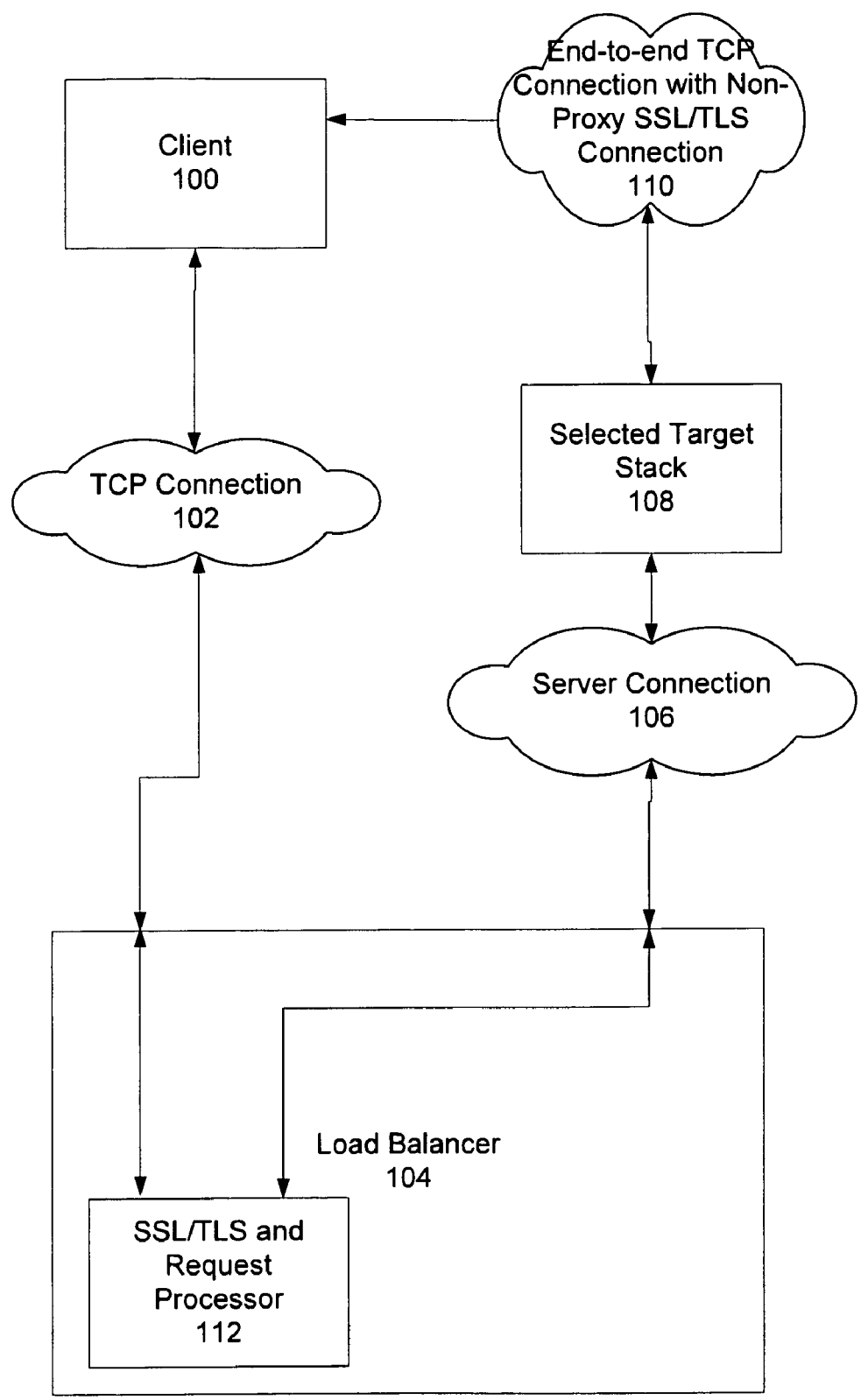
FIG. 1 illustrates an exemplary embodiment of a system for providing non-proxy SSL/TLS support in a content-based load balancer.

FIG. 1 illustrates an exemplary embodiment of a system for providing non-proxy Secure Sockets Layer and Transport Layer Security (SSL/TLS) support in a content-based load balancer. The system includes a client 100, a load balancer 104, and a target stack 108. The client 100 and the load balancer 104 can be connected via a TCP connection 102. Likewise, the load balancer 104 and the target stack 108 can be connected through server connection 106. The server connection 106 can be implemented using any method of establishing a network connection between a load balancer and a server, including a TCP connection. The TCP connection 102 and the server connection 106 can be implemented using any suitable wired or wireless connection.

The load balancer 104 is configured to accept the TCP connection 102 from the client 100. Although only one client is shown in FIG. 1, in some embodiments multiple clients can be utilized, and each client can have its own TCP connection in such embodiments. The load balancer 104 is further configured to establish an SSL/TLS connection with the client 100 such that random data used in key generation is created. The SSL/TLS connection is established over the TCP connection 102, and is described in greater detail below, in the discussion of FIG. 3. The random data used in key generation can include a random number provided by the load balancer 104, which the client 100 and the load balancer 104 process to develop a "key," which can be used to encrypt and decrypt data transferred over the SSL/TLS connection. In an exemplary embodiment, the random data used in key generation can include random numbers generated by the client 100 and the load balancer 104, respectively. These random numbers can be used in encryption algorithms to produce keys used in the encryption and decryption of transmitted and received data, for example.

The load balancer 104 can receive a request from the client 100. The request can be, for example, a request for data associated with a uniform resource indicator ("URI") associated with a web site stored on a server managed by the load balancer 104. The request can be transmitted using TCP connection 102, and the load balancer 104 is configured to decrypt and process the request. The load balancer 104 can include an SSL/TLS and request processor 112, which perform the processing of the request. The decryption is performed using the random data used in key generation described above. In an exemplary embodiment, the request can be decrypted only to the extent necessary for the SSL/TLS and request processor 112 to process the request.

The SSL/TLS and request processor 112 can decrypt and process the request within the TCP kernel of the load balancer 104, or within an application in a user space on load balancer 104, as described below. Furthermore, in an alternative embodiment, SSL/TLS processing and decryption and request processing can be performed by separate components. For example, SSL/TLS processing and decryption can be performed within the TCP kernel, while request processing can be performed by an application in the user-space of the load balancer 104.

Processing the request generally entails examining the content of the request such that the load balancer 104 can locate and select a target stack capable of providing the requested content to the client 100. Processing the request is described with greater detail below, in the discussion of FIG. 2.

The load balancer 104 can then select a target stack, which can be one of many target stacks within the system in some embodiments. The load balancer can then transfer the TCP connection 102, the SSL/TLS connection, and the random data used in key generation to the selected target stack 108 such that the client 100 and the selected target stack 108 maintain an end-to-end TCP connection with a non-proxy SSL/TLS connection 110. Transferring the TCP connection, the SSL/TLS connection, and the random data used in key generation is described with greater detail below, in the discussion of FIG. 2.

The system shown in FIG. 1 can therefore provide a "proxy-less" content-based load balancer capable of supporting SSL/TLS, which can advantageously avoid having the load balancer 104 terminate the TCP connection 102 and maintain a separate TCP connection to the target stack 108, with each TCP connection having its own SSL/TLS connection, for each request made by the client 100. Instead, the client 100 and selected target stack 108 maintain the end-to-end TCP connection with a proxy-less SSL/TLS connection 110. Data packets from the client 100 to the target stack 108 may continue to be routed through the load balancer 104, but in such embodiments the routing generally requires less processing than if the load balancer 104 were acting as a proxy, and may only involve IP forwarding logic. This IP forwarding logic can, in some embodiments, be offloaded to an adapter, which can further reduce the processing burden on the load balancer 104.

Furthermore, data packets from the selected target stack 108 to the client 100 do not need to be routed through the load balancer 104. Since the TCP connection between the client 100 and the selected target stack 108 is end-to-end, the load balancer 104 does not manage any parameters of the TCP state (e.g., window size, segmentation/reassembly, checksums, etc.). Furthermore, since the SSL/TLS connection between the client 100 and the selected target stack 108 is proxy-less, the load balancer 104 is not required to decrypt and re-encrypt every packet sent by the selected target stack 108 to the client 100. These advantages can greatly increase the capacity of the load balancer 104 (i.e., the number of client requests that may be processed) and reduce latency between the client 100 and selected target stack 108.

Additionally, by transferring the SSL/TLS connection to the selected target stack 108, the client certificate can be made available at the selected target stack 108 without requiring any protocol-specific logic.

Figure 2:
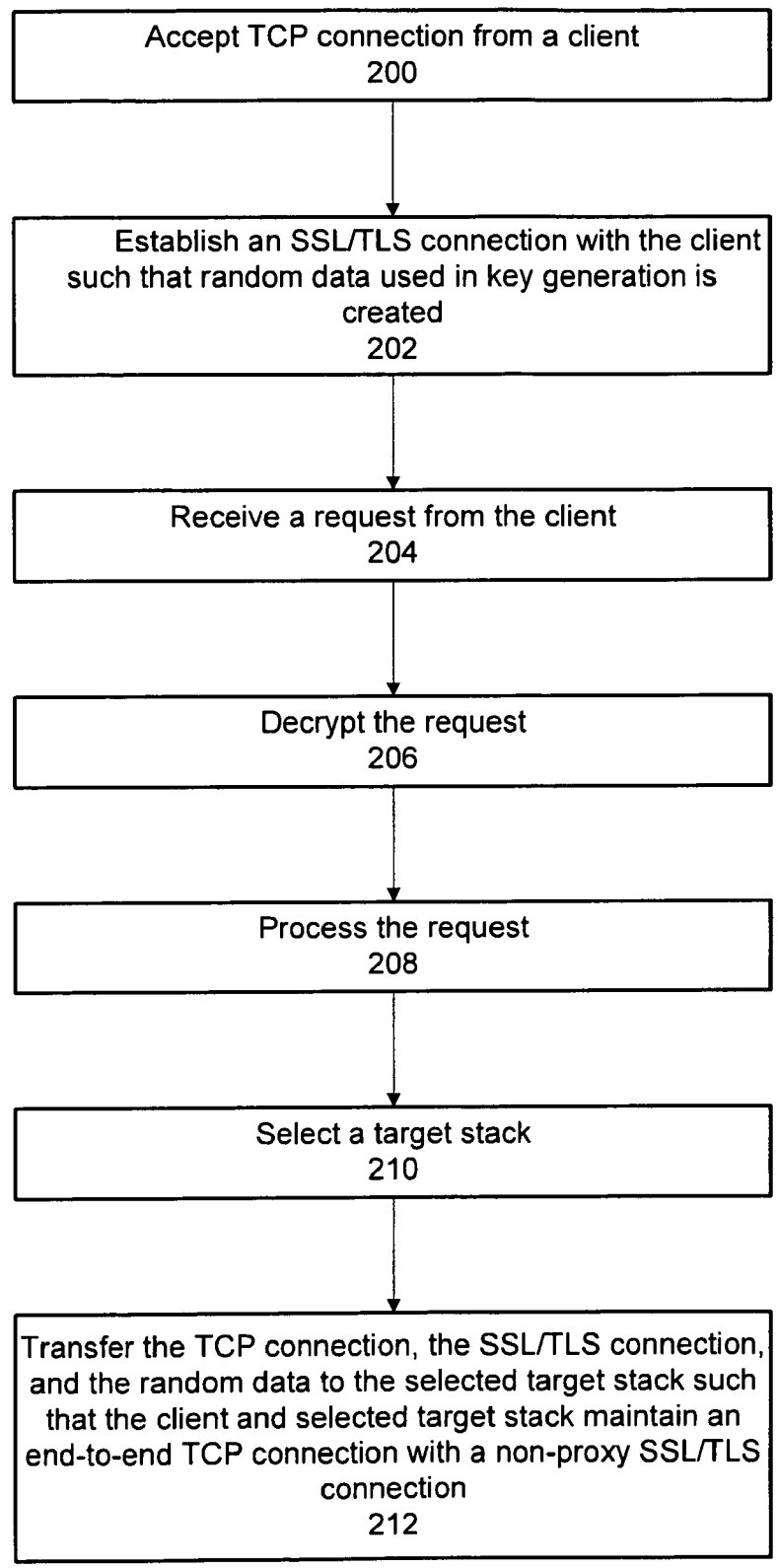
FIG. 2 illustrates an exemplary embodiment of a process for providing non-proxy SSL/TLS support in a content-based load balancer.

FIG. 2 illustrates an exemplary embodiment of a process for providing non-proxy SSL/TLS support in a content-based load balancer. The process shown in FIG. 2 can be performed using the load balancer 104.

A TCP connection is accepted from the client 100 (block 200) and an SSL/TLS connection is established with the client 100 such that random data used in key generation is created (block 202). The SSL/TLS connection can include performing an SSL/TLS handshake, as described below in the discussion of FIG. 3. A request is received from the client 100 (block 204) as described hereinabove.

The request can be decrypted (block 206) and processed (block 208), for example, by the request processor 112, for the purpose of selecting a target stack (block 210). In an exemplary embodiment, the establishing an SSL/TLS connection and the processing of the request are performed within a TCP kernel. This can either be done by using well-defined exits, or by including the decision logic within the kernel itself. In other embodiments, the establishing an SSL/TLS connection and the processing of the request are performed by an application that resides in a user-space on the load balancer 104. The application can, for example, perform the SSL/TLS handshake with the client 100, examine the content of the request and direct the TCP kernel to transfer the request to the selected target stack 108.

When a target stack is selected, the TCP connection 102, the SSL/TLS connection, and the random data are transferred to the selected target stack such that the client and selected target stack maintain the end-to-end TCP connection with a non-proxy SSL/TLS connection 110 (block 212). As is discussed below, the load balancer 104 can then update its connection table so future request packets received from the client 100 can be forwarded to the selected target stack 108. The TCP connection 102 can include TCP data packets, the SSL/TLS connection can include SSL/TLS data packets, and the request can include request data packets. In an exemplary embodiment, the transferring of the TCP connection 102, the SSL/TLS connection, and the random data can be performed by replaying the TCP data packets, the SSL/TLS connection, the random data, and the request data packets to the selected target stack 108. While other methods can be utilized (e.g., marshalling the TCP state at one stack and transferring it out-of-band to the target stack), replaying the TCP data packets and the request data packets has the advantage of reducing the number of changes at the target stack for the transfer of the TCP connection 102. In an exemplary embodiment, a TCP sequence number can be transferred to the selected target stack 108 along with the TCP data packets. This can be done to ensure that all TCP data packets are received by the selected target stack 108 when the TCP connection is transferred, and that the TCP data packets are correctly sequenced.

Figure 3:
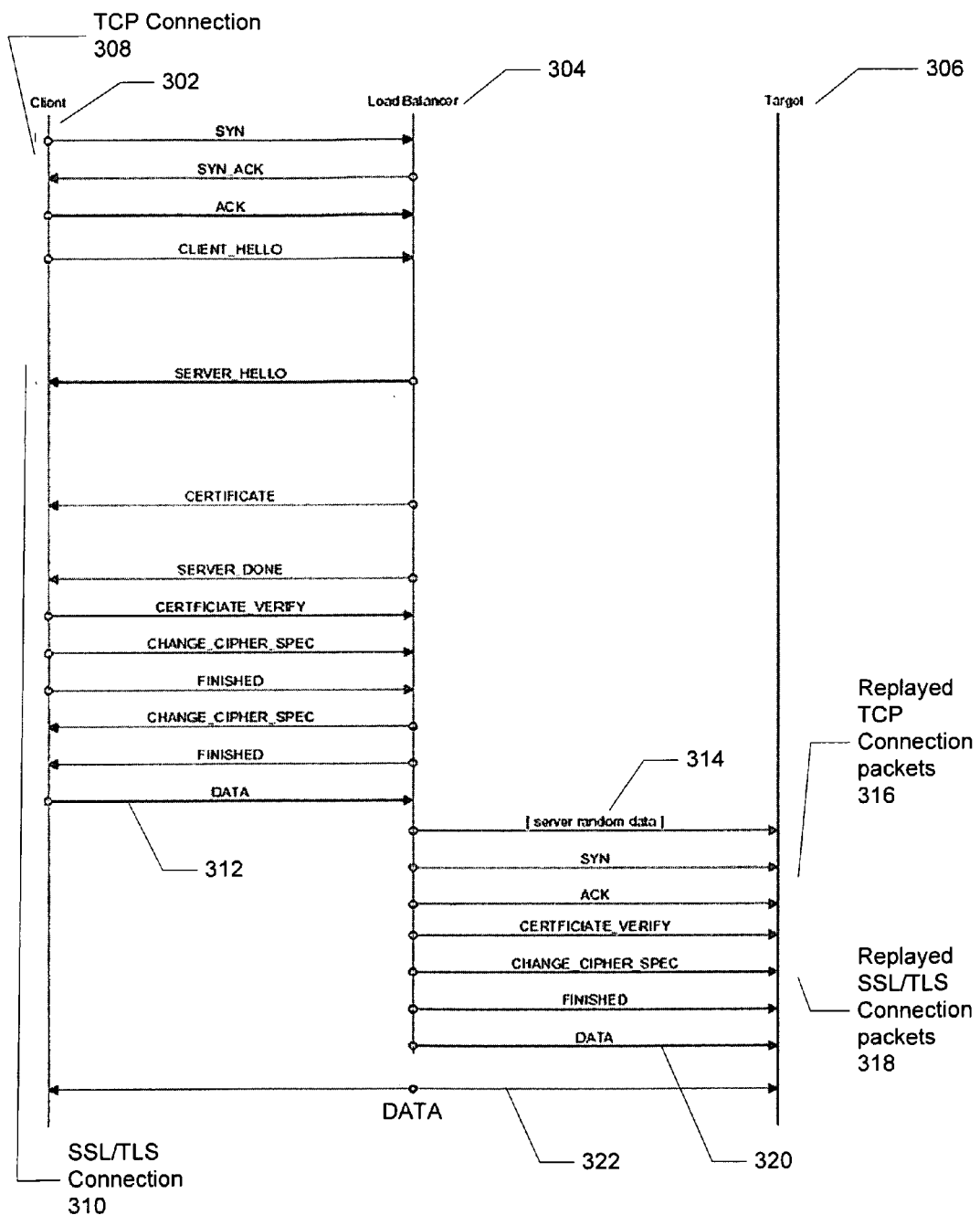
FIG. 3 illustrates an exemplary embodiment of transferring a TCP connection, an SSL/TLS connection, and random data used in key generation from a load balancer to a target stack using a "replay" mechanism.

FIG. 3 illustrates an exemplary embodiment of transferring a TCP connection, an SSL/TLS connection, and random data used in key generation from a load balancer to a target stack using a "replay" mechanism. FIG. 3 shows data packets traveling between a client 302, a load balancer 304, and a target stack 306. A synchronize packet ("SYN") is sent from the client 302 to the load balancer 304, an acknowledgement and synchronization packet ("SYN_ACK") is returned by the load balancer 304 to the client 302, and an acknowledge packet is sent by the client 302 to the load balancer 304. These steps form the "3-way handshake" for a TCP connection 308 between the client 302 and the load balancer 304.

The client 302 can initiate the SSL/TLS connection 310 by sending a "CLIENT_HELLO" message to the load balancer 304. The CLIENT_HELLO can include the highest supported versions of SSL/TLS, the supported cipher suites, and supported data compression methods. If the client 302 has established an earlier SSL/TLS connection to the load balancer 304 and has cached the session ID ("SID"), then the CLIENT_HELLO includes the SID value. Otherwise, the client 302 sends zero as the SID value. The CLIENT_HELLO also includes random data to be used in the key generation algorithm, which is described in greater detail hereinabove.

The load balancer 304 can respond to the CLIENT_HELLO by sending a "SERVER_HELLO" message to the client 302. The SERVER_HELLO can include the SSL/TLS version, the cipher suite, and the data compression method selected by the load balancer 304. As shown in FIG. 3, if the load balancer 304 does not have a cached SID, it can generate a new SID and include the SID with the SERVER_HELLO. The SERVER_HELLO also includes random data to be used in the key generation algorithm, which is described hereinabove.

The load balancer 304 can also transfer a certificate to the client 302. The certificate can contain a public key and authentication signature associated with the load balancer 304. Once the certificate has been transferred, the load balancer 304 can send a "SERVER_DONE" message informing the client 302 that the load balancer has completed SSL/TLS handshake negotiation.

The client 302 can then authenticate the certificate from the load balancer 304, and send a "CERTIFICATE_VERIFY" message to inform the load balancer 304 that the certificate is accepted. The client can then send a "CHANGE_CIPHER_SPEC" message indicating that subsequent data sent by the client 302 will be encrypted. The client 302 can also send a "FINISHED" message to inform the load balancer 304 that transfer is complete. FINISHED may include a hash and MAC over the previous messages sent by client 302.

The load balancer 304 can attempt to decrypt the client's FINISHED message, and verify the hash and MAC. If the decryption or verification fails, the handshake is considered to have failed and the SSL/TLS connection 310 may be terminated. If the decryption and verification succeed, then the load balancer 304 can send a "CHANGE_CIPHER_SPEC" to the client 302 indicating that subsequent data sent by the load balancer 304 will be encrypted. The load balancer then sends FINISHED to the client 302, which performs the same decryption and verification steps described above, thereby establishing SSL/TLS connection 310.

The client 302 can send initial request data packets 312 (shown as "DATA" in FIG. 3), which can be encrypted using SSL/TLS, to the load balancer 304. The load balancer 304 can decrypt and process the initial request data packets 312 as described hereinabove and select a target stack 306. The load balancer 304 can then replay the packets that have been received from the client 302, including the random data 314, TCP connection packets 316, SSL/TLS connection packets 318 (which can be the SSL/TLS connection packets received by the load balancer 304 from the client 302), and the initial request data packets 320, to the selected target stack 306. In an exemplary embodiment, the random data 314 is replayed to the selected target stack 306 before sending the CLIENT_HELLO, so that the target stack can generate keys to perform decryption. Any number of methods can be used to transfer the random data, including storing the random data in a common shared location, or sending the random data out-of-band to the target stack 306. Also, in an exemplary embodiment, the target stack 306 does not send a response to the replayed data sent by the load balancer 304. In another embodiment, responses are sent by the target stack 306 to the load balancer 304, which can be intercepted and discarded by the load balancer 304.

Replaying the 3-way handshake can be advantageous because doing so may reduce the need to adapt the selected target stack 306 to accept the transfer of the TCP connection (e.g., in some embodiments, the selected target stack 306 may need to be adapted to receive the TCP sequence number). In an alternative embodiment, the load balancer 304 can replay only the SYN packet to the selected target stack 306, instead of replaying the entire 3-way handshake. Such an embodiment can be advantageous because fewer packets are being transmitted, thereby reducing the amount of processing overhead for the load balancer 304 when transferring the TCP connection. In another alternative embodiment, the ACK packet may be replayed to the selected target stack 306 as well as the SYN packet, as is shown in FIG. 3.

In an exemplary embodiment, the load balancer 304 can include a connection table, which can identify the target stack 306 associated with each client. The connection table can be updated such that future requests made by the client 302 may be transferred to the selected target stack. The load balancer 304 can then discard all TCP state data maintained for the TCP connection 308 because the TCP connection is maintained end-to-end between the client 302 and the target server 306.

After the target stack 306 has received the replayed data and established a TCP connection and SSL/TLS connection, the target stack 306 can decrypt and process the request packets. Target stack 306 can then return initial response data packets 322 to client 302. As shown in FIG. 3, initial response data packets 322 can be transferred to the client 302 without being routed through the load balancer 304. Such a configuration can be advantageous because it can reduce the amount of processing performed by the load balancer 304. However, in an alternative embodiment, initial response data packets 322 may be routed through the load balancer 304. Furthermore, subsequent inbound or outbound data received by the client 302 or the selected target stack 306 may not need to be processed or decrypted at the load balancer 304, but instead can be forwarded by the load balancer 304 to the appropriate session partner.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A method and system for providing non-proxy SSL/TLS support in a content-based load balancer has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for providing Secure Sockets Layer and Transport Layer Security (SSL and TLS) support in a content-based load balancer comprising:
   accepting a Transmission Control Protocol (TCP) connection from a client;
   establishing an SSL and TLS connection with the client such that random data used in key generation is created;
   receiving a request from the client;
   decrypting the request;
   processing the request;
   selecting a target stack; and
   transferring the TCP connection, the SSL and TLS connection, and the random data to the selected target stack such that the client and selected target stack maintain an end-to-end TCP connection with a SSL and TLS connection, wherein the end-to-end TCP connection between the client and the selected target stack is independent of a termination of the TCP connection accepted from the client and by the content-based load balancer and is independent of a separate TCP connection maintained between the content-based load balancer and the selected target stack.

2. The method of claim 1 wherein the TCP connection comprises TCP data packets, the SSL and TLS connection comprises SSL and TLS data packets and the request comprises request data packets, wherein the transferring the TCP connection is performed by replaying the TCP data packets, the SSL and TLS data packets, the random data and the request data packets to the selected target stack.

3. The method of claim 1 wherein the method is performed using a load balancer.

4. The method of claim 1 wherein the establishing an SSL and TLS connection is performed within a TCP kernel.

5. The method of claim 3 wherein the load balancer comprises a user- space, wherein the establishing an SSL and TLS connection is performed by an application residing within the user-space.

6. The method of claim 1 further comprising transferring a TCP sequence number to the selected target stack.

7. The method of claim 3 wherein the load balancer comprises a connection table, further comprising updating the connection table such that future requests made by the client are transferred to the selected target stack.

8. The method of claim 2 wherein the random data is replayed to the selected target stack before sending the SSL and TLS data packets.

9. A system for providing Secure Sockets Layer and Transport Layer Security (SSL and TLS) support in a content-based load balancer comprising:
   a load balancer, wherein the load balancer is configured to accept a Transmission Control Protocol (TCP) connection from a client, establish an SSL and TLS connection with the client such that random data used in key generation is created, receive a request from the client, decrypt the request, process the request, select a target stack, and transfer the TCP connection, the SSL and TLS connection, and the random data to the selected target stack such that the client and selected target stack maintain an end-to-end TCP connection with a SSL and TLS connection, wherein the TCP connection is end-to-end, wherein the TCP connection between the client and the selected target stack is independent of a termination of the TCP connection accepted from the client and by the load balancer and is independent of a separate TCP connection maintained between the load balancer and the selected target stack.

10. The system of claim 9 wherein the TCP connection comprises TCP data packets, the SSL and TLS connection comprises SSL and TLS data packets and the request comprises request data packets, wherein the load balancer is further configured to transfer the TCP connection by replaying the TCP data packets, the SSL and TLS data packets, the random data and the request data packets to the selected target stack.

11. The system of claim 9 wherein the load balancer further comprises an SSL and TLS and request processor, wherein the SSL and TLS and request processor is configured to decrypt the request and process the request.

12. The system of claim 9 wherein the load balancer further comprises a TCP kernel, wherein the SSL and TLS connection is established within the TCP kernel.

13. The system of claim 9 wherein the load balancer further comprises a user-space, wherein the SSL and TLS connection is established by an application residing within the user-space.

14. The system of claim 9 wherein the load balancer is further configured to transfer a TCP sequence number to the selected target stack.

15. The system of claim 9 wherein the load balancer further comprises a connection table and is further configured to update the connection table such that future requests made by the client are transferred to the selected target stack.

16. The system of claim 10 wherein load balancer is further configured to replay the random data to the selected target stack before sending the SSL and TLS data packets.

17. An executable software product stored on a computer-readable device containing program instructions for providing Secure Sockets Layer and Transport Layer Security (SSL and TLS) support in a content-based load balancer, the program instructions for:
   accepting a Transmission Control Protocol (TCP) connection from a client;
      establishing an SSL and TLS connection with the client such that random data used in key generation is created receiving a request from the client;
   decrypting the request;
   processing the request;
   selecting a target stack; and
   transferring the TCP connection, the SSL and TLS connection, and the random data to the selected target stack such that the client and selected target stack maintain an end-to-end TCP connection with a SSL and TLS connection, wherein the end-to-end TCP connection between the client and the selected target stack is independent of a termination of the TCP connection accepted from the client and by the content-based load balancer and is independent of a separate TCP connection maintained between the content-based load balancer and the selected target stack.

18. The executable software product of claim 17 wherein the TCP connection comprises TCP data packets, the SSL and TLS connection comprises SSL and TLS data packets and the request comprises request data packets, wherein the transferring the TCP connection is performed by replaying the TCP data packets, the SSL and TLS data packets, the random data and the request data packets to the selected target stack.

19. The executable software product of claim 17 wherein the program instructions are executed using a load balancer.

20. The executable software product of claim 17 wherein the establishing an SSL and TLS connection is performed within a TCP kernel.

21. The executable software product of claim 19 wherein the load balancer comprises a user-space, wherein the establishing an SSL and TLS connection is performed by an application residing within the user-space.

22. The executable software product of claim 17 further comprising program instructions for transferring a TCP sequence number to the selected target stack.

23. The executable software product of claim 19 wherein the load balancer comprises a connection table, further comprising updating the connection table such that future requests made by the client are transferred to the selected target stack.

24. The executable software product of claim 20 wherein the random data is replayed to the selected target stack before sending the SSL and TLS data packets.

\* \* \* \* \*